United States Patent [19]

Rossa

[11] 4,432,306
[45] Feb. 21, 1984

[54] PORTABLE HUMANE COW LIFT

[76] Inventor: Dennis J. Rossa, Rte. 2, Arcadia, Wis. 54612

[21] Appl. No.: 413,236

[22] Filed: Aug. 30, 1982

[51] Int. Cl.³ .............................................. A61D 3/00
[52] U.S. Cl. .................................... 119/100; 119/102
[58] Field of Search .................. 119/100, 101, 102, 98

[56] References Cited

U.S. PATENT DOCUMENTS

| | | |
|---|---|---|
| 161,825 | 4/1875 | Relph . |
| 453,727 | 6/1891 | Sample . |
| 671,750 | 4/1901 | Benedict . |
| 866,003 | 9/1907 | Davis ................................ 119/100 |
| 1,318,202 | 10/1919 | Garnier ............................. 119/100 |
| 1,394,783 | 10/1921 | Olinger ............................. 119/100 |
| 2,743,701 | 5/1956 | Boyd . |
| 2,804,845 | 9/1957 | Plumley et al. ...................... 119/102 |
| 2,942,575 | 6/1960 | Boyd et al. . |
| 3,251,496 | 5/1966 | Lamer et al. . |
| 3,621,819 | 11/1971 | Hooper . |
| 3,827,406 | 8/1974 | Berns . |
| 4,318,365 | 3/1982 | Eriksson . |

FOREIGN PATENT DOCUMENTS 11751 of 1891 United Kingdom ................ 119/100

OTHER PUBLICATIONS

Johnson & Co. Manufacturing, Inc. Sales Brochure, Entitled "The New Cow Buoy"

*Primary Examiner*—Robert Peshock
*Assistant Examiner*—Kris R. Schulze
*Attorney, Agent, or Firm*—Ronald M. Anderson

[57] ABSTRACT

Apparatus for lifting a down cow or other like animal. This invention comprises a frame having four vertical legs connected by an array of cross members. The legs and cross members include tubing of similar shape, but of different cross-sectional dimension so that elements of the frame may be hand-carried to a down animal and easily assembled in sliding fit engagement without tools. Two winches each connected to one end of a sling and to the frame are provided to lift the front portion of the animal. A hip clamp adjusted to engage the animal's pelvic bones and a hoist connected to a cross member lift the animal's hind quarters.

14 Claims, 8 Drawing Figures

PORTABLE HUMANE COW LIFT

DESCRIPTION

1. Technical Field

This invention generally pertains to apparatus for lifting heavy animals, and specifically to apparatus especially suitable for lifting cattle unable to rise to their feet.

2. Background Art

When a large animal becomes sick or weakened, it may lie down and thereafter, becoming increasingly weak, be unable to rise to its feet. This is a frequent problem experienced with cattle, and particularly with cows. During calving, cows may experience a loss of motor control due to pressure on nerves and restricted circulation, making it difficult for the animal to stand. Injury, disease, and sometimes undiscernable maladies may also cause a cow or other animal to refuse to stand. After being down for an extended period, the animal can develop respiratory problems, eventually succumbing to pneumonia. For this reason, it is essential that an ailing animal be lifted to its feet as soon as possible.

Various designs for hip clamps intended to clamp and lift the hind quarters of a cow are found in the prior art. Examples are disclosed in U.S. Pat. Nos. 2,743,701; 2,942,575; 3,827,406; and 4,318,365. Typically, these devices include means for adjusting the spacing between two arms which engage the pelvic bone so that the clamp can be used on animals of different size. The clamps are normally used with a block and tackle attached to a convenient overhead support, or are lifted using the front loader of a tractor. While the hip clamp is sometimes successful in encouraging an animal to stand, if the animal is too weak, it may collapse, causing possible injury.

An alternative animal lift is shown in U.S. Pat. No. 3,621,819. In the disclosure of this patent, a stretcher-like frame on wheels is described. The device is positioned so that two relatively narrow belly straps may be secured beneath a cow. The cow is then lifted with a pair of winches and partially supported by the straps within the frame, while being encouraged to walk. As noted in the U.S. Pat. No. 2,743,701 a narrow band bearing upward into a cow's belly is unsuitable for supporting the animal's weight, due to its constriction of the soft midsection where multiple stomachs are located. Even the use of two such straps centered under the belly would be likely to cause a cow extreme discomfort and difficulty in breathing.

A further problem is presented if an animal goes down in an area that is inaccessible to a vehicle or a tractor. A framework on wheels such as that disclosed in U.S. Pat. No. 3,621,819 might be difficult or impossible to maneuver into a steep ravine or over rocky ground to reach the animal. Under such circumstances, a portable lift is required, which can be hand carried to the down animal and assembled on the spot. None of the prior art animal lifts provide this feature.

It is therefore an object of this invention to provide means for lifting a down animal in a humane manner.

It is a further object of this invention to provide an animal lift which is portable and easily assembled on the site where an animal is down.

A still further object of this invention is to provide an animal lift which may be easily disassembled for storage in a compact space.

Yet a still further object is to provide means for lifting and supporting both the front and hind quarters of an animal so that it is in a level attitude and does not experience discomfort or interference with its ability to breathe.

These and other objects of the invention will be apparent from the description of the invention which follows and by reference to the attached drawings.

DISCLOSURE OF THE INVENTION

The invention is an apparatus for lifting a down animal. It comprises a frame including four generally vertical legs connected at their upper ends to four or more cross members arranged in a generally rectangular array. The width of the frame is sufficient so that the legs straddle the down animal when the frame is positioned with its length parallel to the animal. Also included are means for attaching two or more removable cross members to the legs by hand, without tools.

A sling, adapted to be passed under the down animal's thorax immediately behind its front legs, is connected at each end to winch means. The winch means are also connected to the cross members and are operative to separately pull each end of the sling upward toward one of the cross members.

Above the hind quarters of the animal is a hip clamp including a yoke having two downwardly depending arms mounted thereon with means for manually adjusting the spacing between the arms. A loop on the lower end of each arm is operative to engage the animal's pelvic bone as the spacing between the arms is adjusted.

Hoist means connected to the center of the yoke and to the cross members are provided to lift the animal's posterior. The hoist means include a cable and windlass. Selective operation of the winch and the hoist means lifts the animal in a level attitude.

To effect easy assembly and disassembly of the lift, the legs and cross members comprise metal tubing of two different cross-sectional sizes. These elements of the frame thus connect in sliding engagement, and in one embodiment, a "T" handled set screw holds each connection together.

DESCRIPTION OF THE PREFERRED EMBODIMENTS

Figure 1:
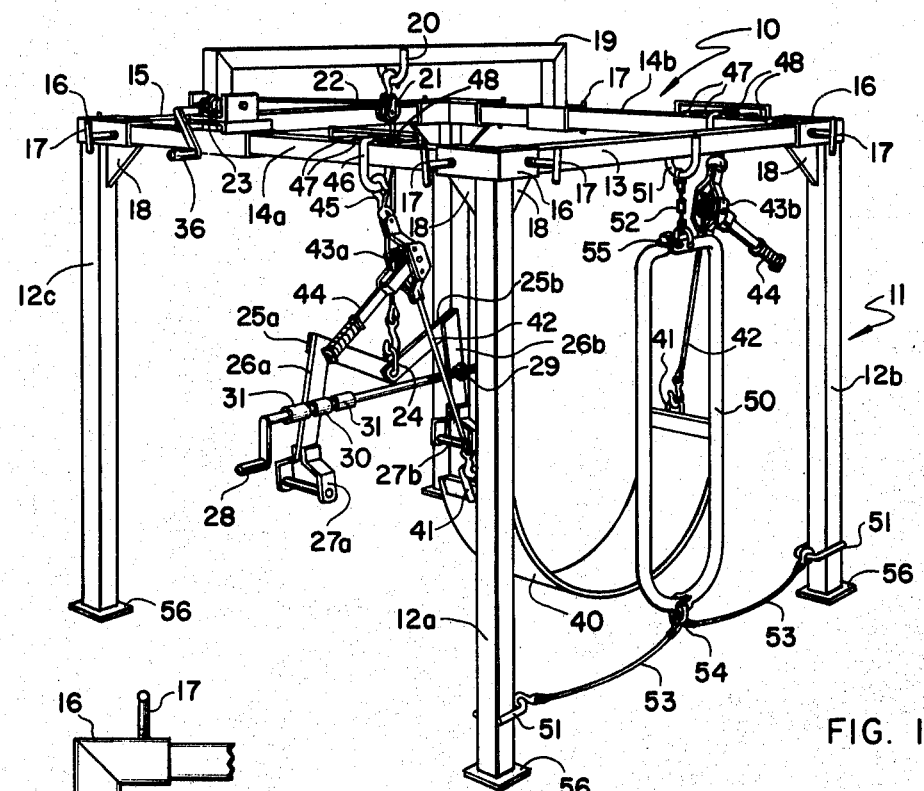
FIG. 1 is a perspective view of the animal lift of this invention.
Figure 5:
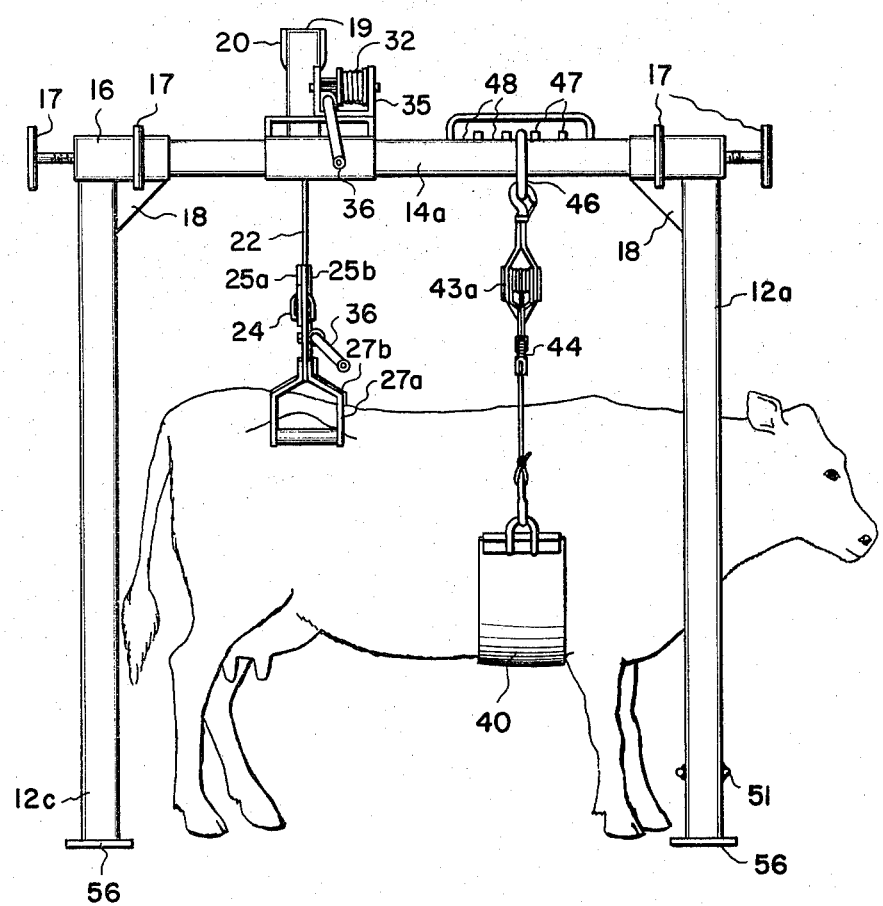
FIG. 5 is a side view of the animal lift illustrating its use in lifting a cow.

Referring to FIGS. 1 and 5, a first preferred embodiment of the animal lift is generally denoted by reference numeral 10. A frame 11 includes four vertical legs 12a–d, formed of 2"×3/16" square metal tubing. Two of the legs 12a and 12d are connected by front cross member 13 having sufficient length to straddle the largest animal with which the lift is to be used. Side cross members 14a and 14b connect legs 12a and 12c, and legs 12b and 12d, respectively. A rear cross member 15 likewise connects legs 12c and 12d, so that the cross members 13, 14, and 15 together form a rectangular array of square metal tubing. The dimensions of this tubing are 1½"×3/16".

Figure 2:
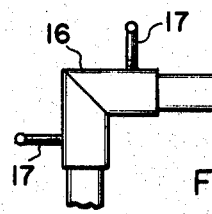
FIG. 2 is a broken-away plan view of one corner of the frame.

Two short sections of square metal tubing 16 are welded to the top of each leg 12, each positioned so that they are aligned with one of two adjacent sides of the leg. These sections 16 comprise the same size tubing used for the legs 12 and have an internal square dimension of 1-10/16". Thus the cross members 13, 14, and 15 may slidingly engage the sections 16 in a close fit and are each held in place by a "T" handled set screw 17. (Ref. FIG. 2.) Set screws 17 are threaded into sections 16, acting to clamp the part of cross members 13, 14, and 15 slid therewithin. This allows the frame 11 to be easily assembled and disassembled without the use of tools. A gusset 18 diagonally reinforces each section 16, where it is welded to legs 12.

A fifth cross member 19, formed in an inverted "U" shape spanning the width of frame 11, is slideably mounted on cross members 14a and 14b using the same larger size square tubing comprising sections 16, and is also locked in place with two "T" handled set screws 17. In the center of cross member 19 is mounted a suspension eye 20 from which a pulley 21 is hung. A cable 22 passes over the pulley 21 and toward cross member 14a where a hoist 23 is mounted on the end of sliding cross member 19. The other end of cable 22 is connected to a hip clamp at pivot loop 24.

The hip clamp includes two yoke arms 25a and 25b pivotably connected at one end by pivot loop 24. Yoke arms 25a and 25b each have a downwardly extending arm 26a and 26b, respectively, welded at their outer end so that each appears as an inverted "L". On the lower end of each arm 26a and 26b is welded a stirrup-shaped loop 27a and 27b, respectively, for engaging the pelvic bone of an animal, and particularly the prominent pelvic bone of a cow as shown in FIG. 5. A threaded crank rod 28 extends between arms 26, connected to each at a point midway between the yoke arms 25 and loops 27.

Figure 6:
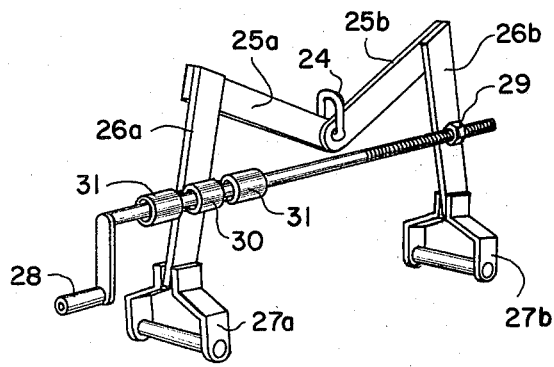
FIG. 6 is an exploded view of the hip clamp adjustment means.

As shown in FIG. 6, crank rod 28 is threaded into a nut 29 pivotably mounted on arm 26b. A guide tube 30 is likewise pivotably mounted on arm 26a. Crank rod 28 passes through guide tube 30 and turns freely within it. Spacer tubes 31 are disposed on crank rod 28, at each side of guide tube 30, and serve as both bearings and spacing elements. Rotation of crank rod 28 adjusts the spacing between arms 26 and this adjustment is thereby operative to clamp loops 27 on the hind quarters of an animal, in engagement with its pelvic bones.

Figure 3:
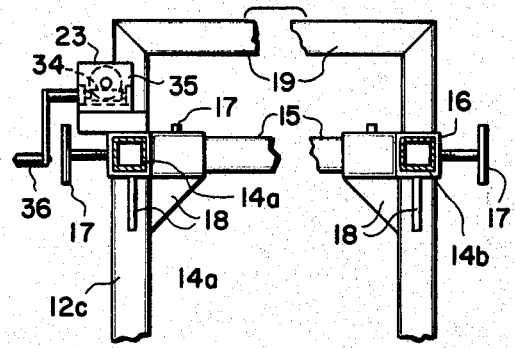
FIG. 3 is a broken-away elevational view of the hoist means, as seen from the front of the lift.
Figure 4:
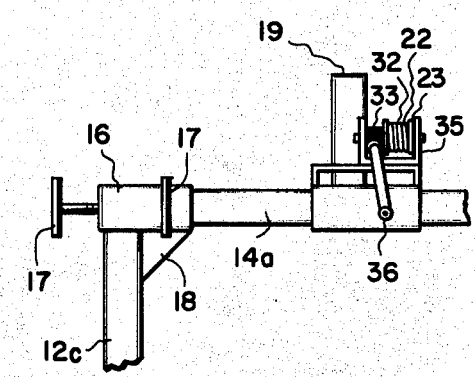
FIG. 4 is a broken-away side elevational view of the hoist means.

Once loops 27 are thus adjusted, the posterior of the animal can be raised with hoist 23. As shown in FIGS. 3 and 4, hoist 23 includes a windlass 32 on which cable 22 is wound. Windlass 32 is rotatably driven by a beveled gear 33 which engages worm gear 34. These gears and the windlass 32 are mounted in a bracket 35, and are in turn rotatably driven either by a manual crank handle 36 as shown in FIG. 3, or alternatively, by an electric hand drill (not shown), chucked onto the shaft of worm gear 34. A Model 640 hoist, available from the Therm Winch Company, or other like device is suitable for use as hoist 23. A worm gear drive is preferred for hoist 23 since it will not allow weight on cable 22 to turn crank handle 36. This prevents possible injury to an operator if crank handle 36 is accidentally released with a load on the hoist.

FIG. 5 shows how the front portion of an animal is lifted with a sling 40. Sling 40 comprises a relatively wide strap (11" in width) of rubberized belting material. Flexible material of this width has been found to cause minimal discomfort and interference with a cow's breathing. Metal loops 41 are attached at each end of the sling 40. Cables 42 are hooked to the loops 41, and are connected to winches 43a and 43b of the type commonly referred to as a "come-along". This type of winch is commercially available from a number of manufacturers and generally includes a framework holding a cable spool and a rachet mechanism actuated by a lever 44. Only the levers 44 are separately identified by a reference numeral, since the construction details of winches 43 are not essential to a disclosure of the invention.

The frame of winches 43 includes a hook 45. Hook 45 engages a "D" shaped ring 46, suspended from each cross member 14. A series of tabs 47 are welded on the upper surface of cross members 14a and 14b, toward the end connected to legs 12a and 12b, respectively. These tabs 47 define slots 48 for adjustably locating rings 46. This determines the point along the length of frame 11 from which the sling 40 is suspended. The slideable adjustment of cross member 19 along cross members 14 and the slots 48 for locating the suspension rings 46 thus permit the lift to be adjusted for use with animals of different body length.

A stanchion 50 is suspended from a loop 51 welded to the center of front cross member 13, by a short chain 52. Two cables 53 connect a bottom pivot link 54 on stanchion 50 to loops 51 welded to legs 12a and 12b. A pivoting retainer clip 55 locks the two halves of stanchion 50 around the neck of an animal and is flipped up so that halves may pivot apart about link 54, to release the animal. Stanchion 50 is considered an optional part of the lift and serves to restrict an animal's movement relative to the frame 11.

The lower end of legs 12 may also optionally include pads 56. These tend to better support the frame 11 if lift 10 is used on soft earth. In addition, pads 56 prevent soil packing into the otherwise open end of the hollow tubing comprising legs 12.

In using animal lift 10, the frame 11 is assembled at the site where the animal is down. The frame components, including the legs 12 and cross members 13, 14, 15, and 19 may easily be hand carried to places inaccessible by vehicle. After the frame 11 is assembled straddling the down animal, sliding cross member 19 is positioned along cross members 14a and 14b to place the hip clamp loops 27 adjacent the animal's hind quarters, and is locked in place with set screws 17. Rotation of crank rod 28 closes arms 26, engaging the animal's pelvic bones in loops 27. If used, stanchion 50 is locked about the animal's neck.

Rotation of hoist crank handle 36 (or actuation of hoist 23 with an electric drill) raises the animal off the ground several inches so that sling 40 may be slipped under its chest. Sling 40 is positioned as far forward as possible, immediately behind the animal's front legs. Cables 42 are attached to loops 41 on each end of sling 40. Rings 46 are placed in the appropriate slots 48 to position winches 43 above sling 40.

Hoist 23 and winch 43a or 43b are operated successively to incrementally raise the animal to a standing position in a level attitude. If the animal is initially on its side, applying more lift with one of the winches 43 can roll it to a level position. A majority of the animal's weight is supported by sling 40, yet the width and forward position of the sling on the chest do not adversely affect the animal.

After the animal is capable of standing on its own, the sling 40 and clamp loops 27 are removed and it is released from stanchion 50. Set screws 17 are then loosened and the frame disassembled. Due to the compact dimensions of its component parts, animal lift 10 may be stored in a limited space.

Figure 7:
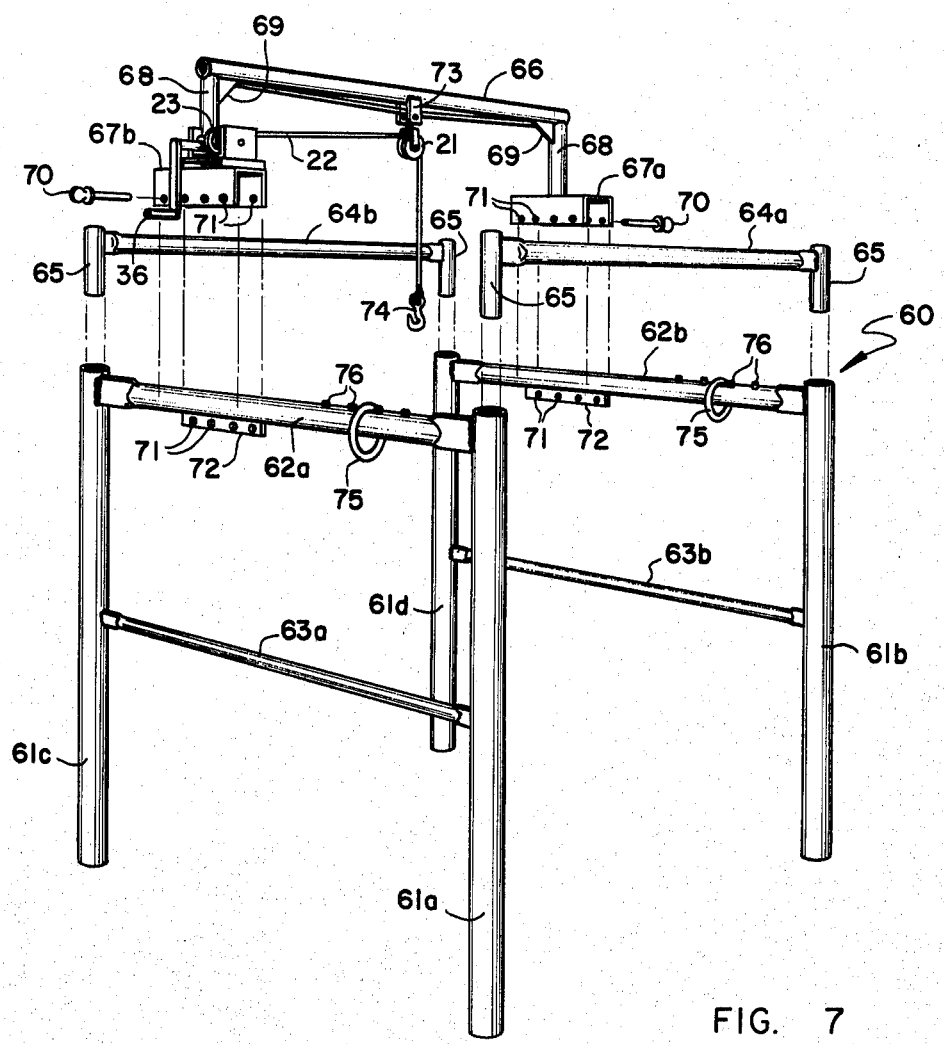
FIG. 7 is an exploded perspective view of a second embodiment of the frame of this invention showing the manner in which the cross members and legs are assembled.

An alternate embodiment for the frame of the subject invention is shown in FIG. 7. In this embodiment, frame 60 comprises four vertical legs 61a–61d of round tubings. Leg 61a is connected to leg 61c by side cross members 62a and side cross member brace 63a, and leg 61b likewise is connected to leg 61d by side cross member 62b and side cross member brace 63b. Side cross members 62 and braces 63 are flattened on each end and are connected to legs 61 by a butt weld; however, other suitable connection means such as bolts and nuts might also be used. Legs 61 and side cross members 62 and braces 63 thus form two coplanar arrays which are normally positioned at each side of a down animal.

Front and rear removable cross members 64a and 64b, respectively, include short vertical end pieces 65 formed of round tubing having a smaller diameter than the round tubing comprising legs 61. End pieces 65 are also butt welded to the flattened ends of cross members 64, and extend downward to slidingly fit within the top of each leg 61 in engaging relationship.

A moveable cross member 66 includes channel bracket 67a and 67b welded to the bottom of a vertical end piece 68. Gussets 69 are used to reinforce the welded joint between end pieces 68 and cross member 66. The open side of channel brackets 67 face downward so that the brackets may rest upon and be adjustably moved along side cross members 62. Channel bracket 67a serves as a support for hoist 23 that is attached thereon. Cross member 66 is positioned along the length of frame 60 so that the hip clamp loops 27a and 27b are adjacent the pelvic bones of the down animal. Retainer pins 70 are then inserted through adjustment holes 71 in the channel bracket which are aligned with similar holes 71 in an adjustment flange 72 welded on the lower surface of each side cross member 62.

Cable 22 wound on hoist 23 passes through the pulley 21 that is suspended from a suspension eye 73 disposed at the center of moveable cross member 66. The suspended cable 22 is attached to a hook 74 that engages pivot loop 24 on the hip clamp.

Each side cross member 62 supports a suspension ring 75, disposed above the front shoulders of the down animal. Rings 75 are adjustably positioned along the length of frame 60 by placement between adjustment tabs 76. A plurality of tabs 76 are welded in spaced apart relationship on the top surface of side cross members 62. Rings 75 engage hooks 45 on the top of winches 43, and are thus used to support the winches 43 as they lift the sling 40 to raise the front portion of the animal. Although not shown, pads 56 may be used on the bottom of legs 61.

Figure 8:
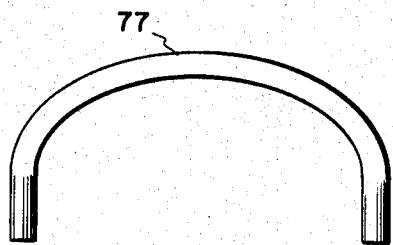
FIG. 8 is an elevational view of an alternate embodiment for a removable cross member comprising the frame of the invention.

Referring to FIG. 8, an alternate member for use in place of removable cross members 64 is shown. The "U" shaped cross member 77, formed of bent round tubing has the advantage of lower cost compared to cross member 64 since it does not require welding.

Other than the differences in assembling frame 60, its use is substantially the same as that disclosed above for frame 11. The hip clamp of FIG. 6, and the winches 43 and sling 40 are not shown in FIG. 7; however, their use with frame 60 should be apparent from the above description. Frame 60 is generally of lower cost and lighter weight than frame 11, and is also easily assembled and disassembled without tools. Like frame 11, frame 60 may be stored in a limited space when disassembled and easily transported by hand to the site of a down animal.

Although animal lift 10 is shown in use for lifting a down cow, both lift embodiments may also be used with similar animals, such as oxen, having extending pelvic bones which may be clamped by loops 27. Other designs for hip clamps, hoists, and winches besides those shown in these preferred embodiments will occur to those skilled in the art. In addition, frames 11 and 60 may be constructed of other than square or round tubing, e.g., of tubing having a rectangular cross section. These and other modifications to the invention as disclosed fall within the scope of the claims which follow.

I claim:

1. Apparatus for lifting a down animal comprising:
   a. a freestanding frame including a plurality of generally vertical legs connected by a plurality of cross members, said frame being adapted to straddle the down animal with a cross member disposed above each side of the animal, and including connecting means for readily attaching two or more of removable cross members to the legs in sliding engagement therewith, to effect easy assembly and disassembly of the frame, whereby it may be hand-carried in parts to the site of a down animal and there readily reassembled;
   b. a sling adapted to be passed under the down animal's thorax, immediately behind its front legs;
   c. winch means connected to each end of said sling and to cross members that extend between the legs of each side of the frame, for lifting the front portion of the animal;
   d. a hip clamp including a yoke having two downwardly depending arms mounted thereon with means for adjusting the spacing between the arms, the lower end of the arms being adapted to clamp the hind quarters of the animal, engaging its pelvic bone as the spacing between the arms is reduced by said adjustment means; and
   e. hoist means connected to the yoke and to the frame, for lifting the posterior of the animal; said hip clamp being suspended from a cross member which spans the width of the frame between the two cross members adjacent each side of the animal, where said spanning cross member slidingly engages each side of the frame and includes means for both adjusting its position along the length of the frame and for mounting the hoist means so that the hip clamp may be properly positioned adjacent the pelvic bone of the animal.

2. Apparatus for lifting a down animal comprising:
   a. a freestanding frame including four generally vertical legs connected adjacent their upper ends with four or more cross members, said cross members forming a generally horizontally disposed rectangular array having a width sufficient so that the legs straddle the down animal, and a length aligned generally parallel to the animal, and including connecting means for attaching two or more removable cross members to the legs by hand and without tools to effect easy assembly and disassembly of the frame, to simplify its transport in parts to the site of a down animal where it may be readily reassembled;

b. a sling adapted to be passed under the down animal's thorax, immediately behind its front legs;

c. first and second winch means, each connected to an end of the sling and to longitudinal cross members that extend between the legs at each side of the frame, for lifting the front portion of the animal by separately pulling each end of the sling generally upward toward one of the cross members;

d. a hip clamp including a yoke having two downwardly depending arms mounted thereon with means for manually adjusting the spacing between the arms, the lower end of the arms each including a loop to engage the animal's pelvic bone as the spacing between the arms is adjusted with the adjustment means so as to clamp the hind quarters of the animal; and e. hoist means connected to the center of the yoke and to said longitudinal cross members that extend between the legs for lifting the posterior of the animal, said hoist means including a cable and a windlass; said hip clamp being suspended from a cross member which spans the width of the frame between the two cross members adjacent each side of the animal, where said spanning cross member slidingly engages each side of the frame and includes means for both adjusting its position along the length of the frame and for mounting the hoist means so that the hip clamp may be properly positioned adjacent the pelvic bone of the animal.

3. The apparatus of claim 1 or 2 wherein the frame comprises metal tubing of similar cross-sectional shape, but of larger and smaller cross-sectional dimension, the outer dimensions of the smaller tubing being only slightly less than the internal dimensions of the larger tubing, so that the smaller tubing closely fits within the larger tubing, in sliding engagement.

4. The apparatus of claim 3 wherein the means for attaching the removable cross members to the legs comprise a short substantially horizontal segment of one of the larger or smaller cross section tubing connected to each of the legs and operative to slidingly engage one of the removable cross members which is formed of the tubing having the other of the larger or smaller cross section, said means for attaching the removable cross members also comprising a set screw for retaining the cross member in engaged relationship with said short segment of tubing.

5. The apparatus of claim 3 wherein a first pair of legs are connected in generally co-planar relationship, by two cross members intended to remain so attached, a second pair of legs are connected in generally co-planar relationship by two other cross members intended to remain so attached, and the first and second pair of legs are connected together by said two or more removable cross members, using said means for attaching the cross members to the legs to effect easy assembly and disassembly of the frame.

6. The apparatus of claim 3 wherein the means for attaching the removable cross members to the legs comprises a short substantially vertical segment of one of the larger or smaller cross section tubing connected to each end of the removable cross members, and operative to slidingly engage one of the legs formed of the tubing having the other of the larger or smaller cross section.

7. The apparatus of claim 3 wherein the removable cross members are formed of one of the larger or smaller cross section tubing and are generally "U" shaped with each end substantially vertical; and wherein the means for attaching the removable cross members to the legs comprises a sliding engagement of each end of the "U" shaped cross members with one of the legs formed of the tubing having the other of the larger or smaller cross section.

8. Apparatus for lifting a down animal comprising a. a freestanding frame including four generally vertical legs and five or more cross members, said legs having means for removably connecting two or more of the cross members to the top of the legs in sliding engagement therewith, so that at least four of the cross members are generally at right angles to each other, the cross members thereby being arranged in a substantially rectangular array, the width of the rectangular array being sufficient to straddle the down animal, and the length aligned generally parallel to the animal; said connecting means being operative to effect easy manual assembly and disassembly of the frame;

b. a sling comprising a flexible strap adapted to be passed under the down animal's thorax, immediately behind its front legs;

c. first and second winch means for lifting the front portion of the animal, said winch means each including a lever actuated mechanism connected to one of the cross members extending between the legs at each side of the animal, and means for connecting each end of the sling to said mechanisms, whereby the first and second winch means are operative to incrementally and separately lift each end of the sling when one of the levers is moved through an arc;

d. a hip clamp including a yoke having two downwardly depending arms mounted thereon, with means for manually adjusting the spacing between the lower ends of the arms, said adjustment means including a crank arm connected to a screw mechanism bridging the arms; said arms each having a loop disposed at its lower end; whereby the adjustment means are operative to clamp the animal's hind quarters, engaging its pelvic bone with the loops as the crank arm is turned; and e. hoist means for lifting the posterior of the animal, said hoist means including a pulley mounted on a fifth cross member, a windlass mounted on one of said four cross members, and a cable connected to the center of the yoke, passing around the pulley and wound on the windlass; said hip clamp being suspended from the fifth cross member which spans the width of the frame between the two cross members adjacent each side of the animal, where said spanning cross member slidingly engages each side of the frame and includes means for both adjusting its position along the length of the frame and for mounting the hoist means so that the hip clamp may be properly positioned adjacent the pelvic bone of the animal.

9. The apparatus of claim 8 wherein the frame comprises metal tubing of similar cross-sectional shape, but of larger and smaller cross-sectional dimension, the outer dimensions of the smaller tubing being only slightly less than the internal dimensions of the larger tubing, so that the smaller tubing closely fits within the larger tubing.

10. The apparatus of claim 9 wherein the connecting means comprises two short segments of one of the larger or smaller cross section tubing welded in orthogonal relationship to each other and to one of the legs, each segment operative to slidingly engage one of the removable cross members which is formed of the tubing having the other of the larger or smaller cross section, said connecting means also including a "T" handled set screw for retaining each removable cross member in engaged relationship with each of said short segments of tubing.

11. The apparatus of claim 9 wherein the means for connecting the removable cross members to the legs comprises a sliding fit engagement of each end of the removable cross members with one of the legs, said removable cross members including tubing formed of one of the larger or smaller cross section tubing and the legs being formed of tubing having the other of the larger or smaller cross section.

12. The apparatus of claim 11 wherein the removable cross members are generally "U" shaped and span the width of the frame, the cross members spanning the length thereof not intended to be as readily removable.

13. The apparatus of claim 8 further comprising means for adjusting the position where the lever actuated rachet mechanism connects to the cross members, along the length of the frame, so that the apparatus is useable with different size animals.

14. The apparatus of claim 8 further comprising a stanchion disposed at one end of the frame, adapted to clamp the animal's neck to restrain its motion relative to the frame.

* * * * *